(12) United States Patent
Kateman

(10) Patent No.: US 7,640,755 B1
(45) Date of Patent: Jan. 5, 2010

(54) DYNAMIC PROCESS CONTROL

(75) Inventor: Paul R. Kateman, Wellesley, MA (US)

(73) Assignee: MooBella, LLC, Taunton, MA (US)

( * ) Notice: Subject to any disclaimer, the term of this patent is extended or adjusted under 35 U.S.C. 154(b) by 559 days.

(21) Appl. No.: 11/157,463

(22) Filed: Jun. 20, 2005

Related U.S. Application Data

(63) Continuation of application No. 10/359,834, filed on Feb. 7, 2003, now Pat. No. 6,907,741.

(51) Int. Cl.
*B65B 63/08* (2006.01)

(52) U.S. Cl. .............................. 62/60; 62/132; 426/383; 426/393; 53/127; 222/52; 99/334

(58) Field of Classification Search ...................... 62/60, 62/132; 426/383, 393; 53/127; 141/82; 235/385; 705/22, 28; 222/1, 52; 99/334
See application file for complete search history.

(56) References Cited

U.S. PATENT DOCUMENTS

| | | | |
|---|---|---|---|
| 3,590,727 A | 7/1971 | Shevlin | 99/359 |
| 3,632,245 A | 1/1972 | Getman | 425/130 |
| 3,660,988 A | 5/1972 | Garavelli | 62/306 |
| 3,695,314 A * | 10/1972 | Watts et al. | 141/59 |
| 3,803,870 A | 4/1974 | Conz | 62/342 |
| 3,874,189 A | 4/1975 | Calim | 62/306 |
| 3,876,110 A | 4/1975 | Logie | 222/80 |
| 3,954,126 A | 5/1976 | Piana | 141/48 |
| 4,052,180 A | 10/1977 | Erickson | 62/188 |
| 4,119,252 A | 10/1978 | Bernard | 225/96 |
| 4,124,339 A | 11/1978 | Bernard | 425/133.1 |
| 4,165,818 A | 8/1979 | Bernard | 222/53 |
| 4,193,272 A | 3/1980 | Bernard | 62/320 |
| 4,209,534 A | 6/1980 | Poznanski et al. | 426/42 |
| 4,241,847 A | 12/1980 | Lancia et al. | 221/12 |
| 4,244,470 A | 1/1981 | Burnham | 206/525 |
| 4,301,659 A | 11/1981 | Martin et al. | 62/57 |
| 4,316,490 A | 2/1982 | Meyer | 141/9 |
| 4,473,098 A | 9/1984 | Sawvel | 141/172 |
| 4,645,093 A | 2/1987 | Jones | 221/93 |
| 4,752,197 A | 6/1988 | Getman | 425/104 |
| 4,803,086 A | 2/1989 | Hedenberg | 426/87 |
| 5,018,363 A | 5/1991 | Aoki et al. | 62/135 |
| 5,027,698 A | 7/1991 | Chirnomas | 99/450.1 |
| 5,083,591 A * | 1/1992 | Edwards et al. | 141/9 |
| 5,105,978 A | 4/1992 | Trouteaud et al. | 221/150 |

(Continued)

FOREIGN PATENT DOCUMENTS

WO    WO 88/00741    1/1988

(Continued)

*Primary Examiner*—Marc E Norman
(74) *Attorney, Agent, or Firm*—Mintz, Levin, Cohn, Ferris, Glovsky and Popeo PC

(57) ABSTRACT

A method and apparatus for defining the processing of an ingredient of a manufactured product, particularly one that is manufactured "one-the-spot" to a consumer's specification, such as ice cream, among other products. A tag encoded on a container for the product carries indicia that, directly or indirectly, define one or more formulations for the product. Apparatus into which the ingredient is loaded sets the processing of ingredients in accordance with the formulations so specified. By connecting the apparatus which is to process the ingredients to a control station, the formulations may be changed at will.

9 Claims, 7 Drawing Sheets

U.S. PATENT DOCUMENTS

| | | | |
|---|---|---|---|
| 5,121,854 A | 6/1992 | Trouteaud et al. | 221/15 |
| 5,281,429 A | 1/1994 | Zevlakis | 426/389 |
| 5,285,041 A | 2/1994 | Wright | 219/717 |
| 5,292,030 A | 3/1994 | Kateman et al. | 222/1 |
| 5,382,090 A | 1/1995 | Cocchi | 366/177 |
| 5,403,611 A | 4/1995 | Tomita et al. | 426/565 |
| 5,433,967 A | 7/1995 | Kateman et al. | 426/565 |
| 5,464,119 A | 11/1995 | Giuseppe et al. | 221/156 |
| 5,473,909 A | 12/1995 | Kateman et al. | 62/306 |
| 5,603,257 A | 2/1997 | Kateman et al. | 99/455 |
| 5,727,713 A | 3/1998 | Kateman et al. | 222/145.6 |
| 5,758,571 A | 6/1998 | Kateman et al. | 99/455 |
| 5,794,820 A | 8/1998 | Shabbits et al. | 222/307 |
| 5,868,065 A | 2/1999 | Haggerty et al. | 99/455 |
| 5,997,924 A | 12/1999 | Olander, Jr. et al. | 426/296 |
| 6,060,099 A | 5/2000 | Ito | 426/243 |
| 6,085,645 A | 7/2000 | Huang | 99/455 |
| 6,099,874 A | 8/2000 | Tucker et al. | 426/91 |
| 6,186,358 B1 | 2/2001 | Peteraf | 221/85 |
| 6,196,113 B1 | 3/2001 | Yung | 99/327 |
| 6,209,590 B1 | 4/2001 | Mandsberg | 141/1 |
| 6,277,434 B1 | 8/2001 | Matluk-Boisseau | 426/635 |
| 6,292,784 B1 | 9/2001 | Martin et al. | 705/11 |
| 6,308,522 B1 | 10/2001 | Jones et al. | 62/114 |
| 6,325,244 B2 | 12/2001 | Vincent et al. | 222/1 |
| 6,698,228 B2 | 3/2004 | Kateman et al. | 62/346 |
| 6,745,595 B1 | 6/2004 | Kateman et al. | 62/458 |
| 6,889,603 B2 | 5/2005 | Carhuff et al. | 99/452 |
| 6,907,741 B2 | 6/2005 | Kateman | 62/60 |
| 6,931,984 B2 | 8/2005 | Lassota | 99/280 |
| 6,941,858 B2 | 9/2005 | Kateman | 99/455 |
| 6,952,928 B2 | 10/2005 | Kateman et al. | 62/71 |
| 7,052,728 B2 | 5/2006 | Kateman et al. | 426/515 |
| 7,131,279 B2 | 11/2006 | Kateman et al. | 62/71 |
| 2001/0038019 A1 | 11/2001 | Vincent et al. | 222/95 |
| 2002/0022073 A1* | 2/2002 | Soehnlen et al. | 426/393 |
| 2002/0027164 A1 | 3/2002 | Mault et al. | 235/462.46 |
| 2003/0006281 A1 | 1/2003 | Thomas et al. | 235/385 |
| 2003/0010791 A1 | 1/2003 | Gentiluomo et al. | 221/92 |
| 2003/0028285 A1 | 2/2003 | Zura et al. | 700/241 |
| 2004/0238555 A1* | 12/2004 | Parks | 221/80 |
| 2005/0043011 A1 | 2/2005 | Murray et al. | 455/405 |
| 2005/0115597 A1 | 6/2005 | Carhuff et al. | 134/134 |
| 2006/0003065 A1 | 1/2006 | Kateman | 426/506 |
| 2006/0054614 A1 | 3/2006 | Baxter et al. | 219/400 |
| 2006/0108415 A1 | 5/2006 | Thomas et al. | 235/381 |
| 2006/0162347 A1 | 7/2006 | Kateman et al. | 62/71 |
| 2006/0162348 A1 | 7/2006 | Kateman et al. | 62/71 |
| 2007/0251260 A1 | 11/2007 | Baxter et al. | 62/342 |

FOREIGN PATENT DOCUMENTS

| | | |
|---|---|---|
| WO | WO 00/54172 | 9/2000 |
| WO | WO 2004-072913 | 8/2004 |
| WO | WO 2006/016241 A1 | 2/2006 |

* cited by examiner

| Serial Number| Ingredient Type| Expiration Date| Amount|Display Identifier|

Fig. 4A

| Flavoring #1: 0.03 oz/oz| Flavoring #2: 0.025 oz/oz| Flavoring #3: 0.18 oz/oz|.....|Mix-In #1: 0.3 oz/oz| Mix-In #2: 0.27 oz/oz|.....|Freezing Duration: 90 seconds| Aeration Duration: 60 seconds| Aeration Pressure: 20 psi|

Fig 4B

DYNAMIC PROCESS CONTROL

This application is a Continuation of U.S. patent application Ser. No. 10/359,834 filed Feb. 7, 2003 (now U.S. Pat. No. 6,907,741 B2).

BACKGROUND OF THE INVENTION

1. Field of the Invention

The invention relates to dynamic process control, especially as applied to on-the-spot manufacture of food products, particularly frozen food products.

2. Background Information

The history of manufacture has been that of a progression from individual, local, hand-crafted preparation and construction to mass manufacture and distribution. For most manufactures, the latter mode is generally characterized by substantial economic efficiency and thus has largely replaced the former. In some areas, such as food preparation, individual preparation of an item to be served is still common although, even here, mass manufacture has made headway, and prepackaged foods such as frozen dinners have eliminated much or most of the individual preparation. While some food products such as meats, pastas, etc. still accommodate individual preparation and flavoring such as by the addition of spices, sauces, and the like, others such as ice cream, yogurt, etc. are supplied in essentially the final flavored form, with little opportunity to adjust the underlying product itself to a particular taste.

Many branded food products are distributed to the end user through chains of restaurants, as well as through individual stands or kiosks, with final preparation done on site. Control of the uniformity of the end products is important, as is the ability to quickly introduce and control changes in the formulation of the product from time to time and even from place to place. This has been difficult to do on a broad basis.

In the field of frozen food products such as ice cream, yogurt, and the like, a significant change in the manufacture and distribution of such products is described in a series of patents issued to the present applicant: see, e.g., U.S. Pat. No. 5,292,030 issued Mar. 8, 1994 to Paul Kateman et al. for "Method and Apparatus For Producing and Dispensing Aerated Products". This series of patents describes the on-the-spot production of frozen food products such as ice cream, yogurt, and the like in individual-sized servings of various flavors and with the option of additional mix-ins such as nuts, candies, etc. The present invention extends the capabilities of such methods and apparatus by enabling the controlled variation of the production process.

SUMMARY OF THE INVENTION

Accordingly, it is an object of the present invention to enhance the control of on-the-spot product manufacture of various products.

Further, it is an object of the invention to enhance the control of on-the-spot manufacture of food products.

Still a further object of the invention to enhance the control of on-the-spot manufacture of frozen food products such as ice cream and the like.

Yet a further object of the invention is to enable the individual particularization of the processes of on-the-spot manufacture of various products to one or more of the specific product inputs.

Yet another object of the invention is to facilitate localized and isolated changes in the formulation of products manufactured on-the-spot.

BRIEF DESCRIPTION OF THE DRAWINGS

The invention description below refers to the accompanying drawings, of which:

FIG. 1 is a view in perspective of one embodiment of apparatus for on-the-spot manufacture of frozen food products such as ice cream, yogurt and the like;

FIGS. 4A and 4B show illustrative dynamically adjustable parameters encoded in connection with ingredient containers in accordance with the present invention;

DETAILED DESCRIPTION OF AN ILLUSTRATIVE EMBODIMENT

Figure 1:
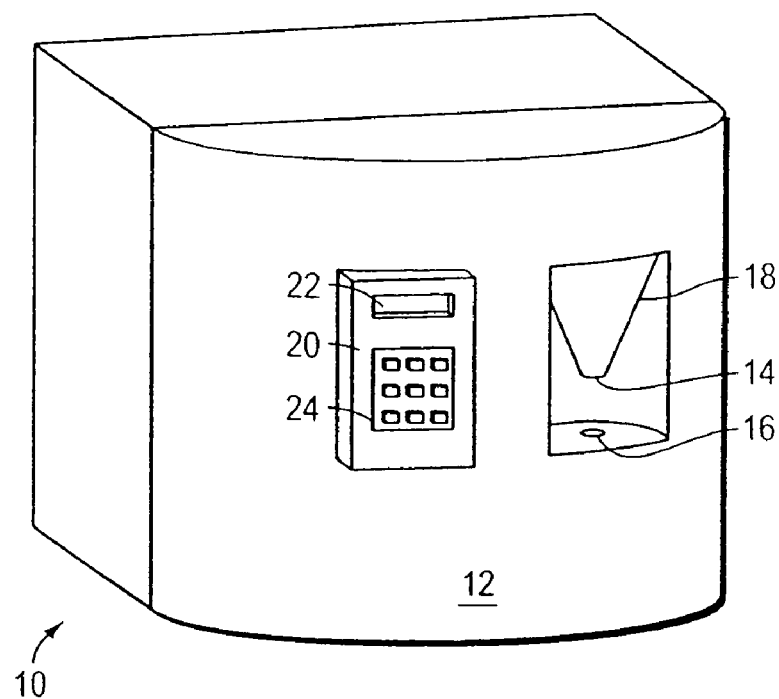

In FIG. 1, apparatus 10 for manufacturing on-the-spot an individual serving of a frozen food product such as ice cream, yogurt or the like comprises a hinged cabinet 12 having a dispensing station 14 including a stand 16 for receiving a cup or other container for a product to be dispensed and a dispenser 18 located above the stand. A dispensing control panel 20 includes a keypad 22 for selecting a product to be manufactured on-the-spot and dispensed to the consumer, and a display 24 for indicating the selections made. For purposes of description, the product will be described as ice cream of various flavors and with or without mix-ins such as nuts, candies, and the like, although it will be understood that a variety of other products are amendable to similar manufacturing control. The keypad 24 enables the operator to select, for example, the particular flavor, the amount to be dispensed, and one or more mix-ins, as specified by a customer for whom an individual-sized serving is to be prepared.

Figure 2:
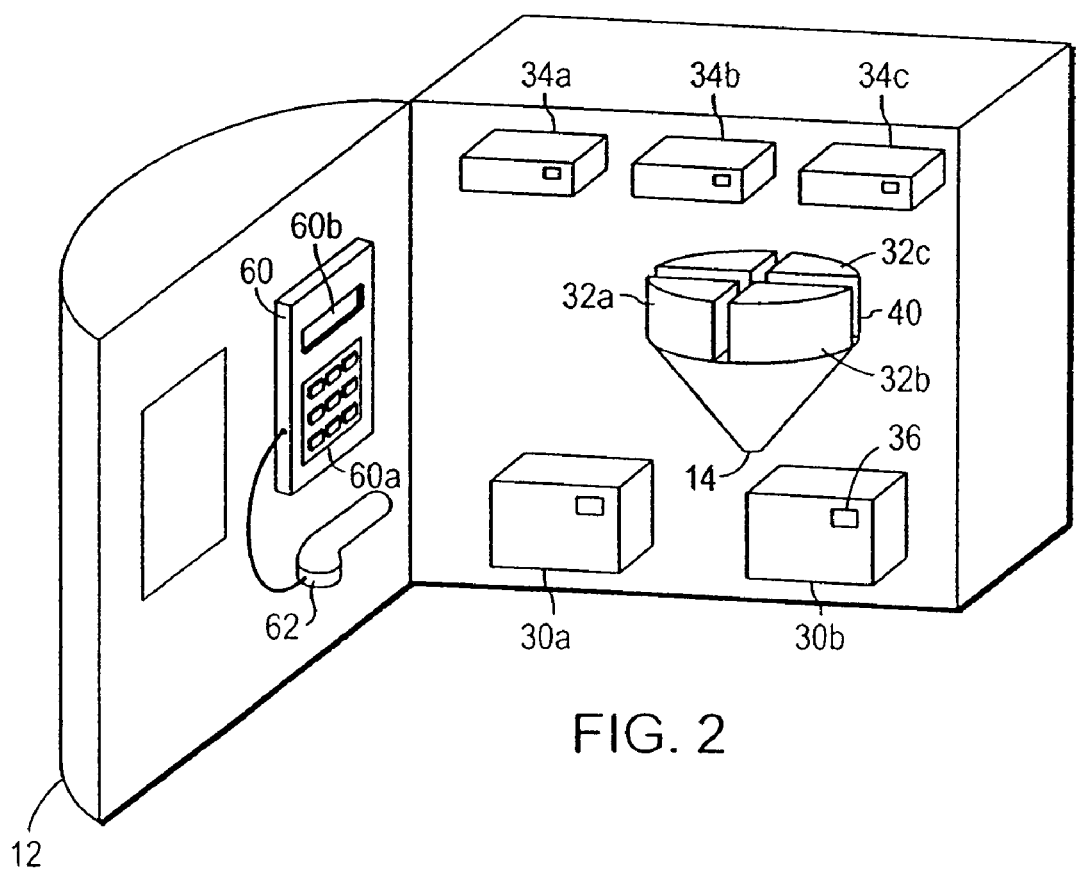
FIG. 2 is a view in perspective of the interior of the apparatus of FIG. 1.

Turning now to FIG. 2, the apparatus of FIG. 1 is shown with the front panel opened to expose the interior thereof. Receptacles 30, 32, 34 are provided in the apparatus 10 to receive containers of various ingredients from which the final product is to be produced. For example, receptacle 30a may hold a container of a low-fat neutral base dairy mix from which end product ice cream or yogurt is to be produced, while receptacle 30b may hold a container of a higher-fat form of the base mix. Receptacles 32a, 32b, 32c, etc. may hold containers of various flavorings, such as vanilla, chocolate, strawberry, etc. Receptacles 34a, 34b, 34c, etc. may hold containers of mix-ins, such as nuts, candies, etc. Preferably, each receptacle carries an indicator tag, such as tag 36 on receptacle 30a, that identifies it to the production process, as explained in more detail below.

The receptacles are connected to provide their contents to a formulator 40 which mixes the ingredients and otherwise processes them to form the end product in the desired amount, and then dispenses them through dispensing head 14. An example of an appropriate formulator by means of which the end product may be manufactured and dispensed is described in the copending patent application of Paul Kateman et al., Ser. No. 10/160,674, filed Jul. 31, 2002 entitled "Method and Apparatus For Producing and Dispensing An Aerated And/Or Blended Food Product" and assigned to the assignee of the present invention; the contents of that application are expressly incorporated herein by reference.

Figure 3:
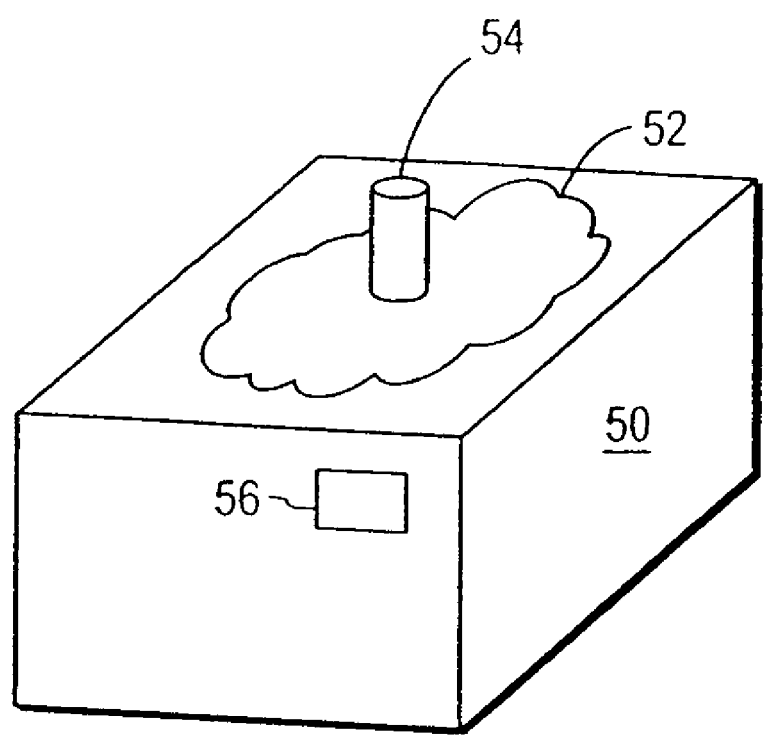
FIG. 3 illustrates an example ingredient container encoded for particularized on-the-spot manufacturing.

FIG. 3 illustrates an example ingredient container for loading into one of the receptacles of FIG. 2 and encoded for particularized on-the-spot manufacturing. Container 50 may, for example, be structured to hold a neutral base mix for producing individual servings of ice cream and, for this purpose, may enclose an inner flexible pouch 52 having a connector 54 for feeding its contents to the formulator 40. The latter processes the various ingredients to produce the finished product which is dispensed to the user. The construction of one such formulator is set forth in U.S. patent application Ser. No. 10/160,674 referred to above.

In accordance with one part of the present invention, the container carries a tag 56 in a suitable location, preferably the exterior thereof, which bears, inter alia, information ("process information") defining the manner in which the contents may be processed. As illustrated in FIG. 4A, the tag may be encoded with a serial number identifying the specific container or a group of particular containers; an ingredient type designator, indicating, for example, that the container contains "base mix, low fat content" or "flavoring, vanilla"; an expiration date, after which the ingredient should not be used; the amount of ingredient (e.g., volume, weight, etc.); a display name for viewing by the operator; and, most importantly, one or more "formulations", as exemplified in FIG. 4B, defining appropriate processing for the ingredient.

The formulations are, of course, specific to the product being manufactured and the process by which they are being manufactured. Further, the formulations may specify the physical process conditions (e.g., time, temperature, pressure, etc.) under which the ingredient, or product formulated using that ingredient, is to be used, and may also specify the proportions of the ingredient to be used with other ingredients. Thus, in the case of ice cream that is manufactured in accordance with patent application Ser. No. 10/160,674 noted above, as shown in FIG. 4B the formulation associated with a particular ingredient may define the type and amount of other ingredients that are desirable or permissible for use with the ingredient in question, as well as some or all of the physical processing conditions and the processing steps to be followed.

For example, a container of a low-fat neutral base mix for ice cream may specify the identity and concentration of flavorings that are appropriate or permitted for use with that particular base (e.g., "Flavoring #1: 0.03 oz/oz"; "Flavoring #2: 0.025 oz/oz"; etc.); the type and amount of mix-ins (e.g., "Mix-In #1: 0.3 oz/oz"; "Mix-In #2: 0.27 oz/oz", etc.); the length of time during which the ingredients are to be subjected to one or more of the process steps (e.g., "Freezing Duration: 90 seconds"; "Aeration Duration: 60 seconds"); and the aeration pressure (e.g., "Aeration Pressure: 20 psi"). Other types of ingredients may specify different formulations appropriate to that ingredient. It will be understood that other parameters may be included in the formulation and that, conversely, one or more of the above parameters may be omitted.

The process information may be encoded on the container tags in a variety of manners, including optically readable strips; magnetically readable strips; and electronically readable constructs such as memory sticks and chips containing other active or passive electric or electronic circuits, to mention just a few. In the embodiment of the invention described specifically herein, it is encoded in optically scannable bar code. The tags may thus simply comprise printed areas on the container or may comprise labels or even electric circuits affixed to, or otherwise associated with, the container and encoding the desired information therein.

Referring again to FIG. 2, a control panel 60 is mounted on the inside of front panel 12. The control panel 60 includes a keypad 60a and a display panel 60b. A hand-held scanner 62 is removably mounted on the inside of front panel 12, and is connected to control panel 60 to provide data input thereto. With the apparatus 10 open as indicated, an operator charges the apparatus with ingredients by loading containers such as container 50 into receptacles such as receptacles 30, 32, 34. As noted above, the receptacles are preferably particularized to the type of ingredient to be loaded, i.e., base mix, flavoring, mix-in, etc. In the process of loading an ingredient, the operator scans both the tag 36 of the receptacle and the tag 56 of the ingredient container. Scanning the former identifies to the system controller the specific receptacle into which the ingredient is being loaded, and thus enables the system to extract a desired ingredient during product processing. Scanning the latter identifies to the system the specific ingredient which is being loaded and enables the system to verify that a given ingredient is loaded into an appropriate receptacle; it also loads into the system the particular processing parameters and other data either set forth on, or associated with, the tag 56.

Figure 5:
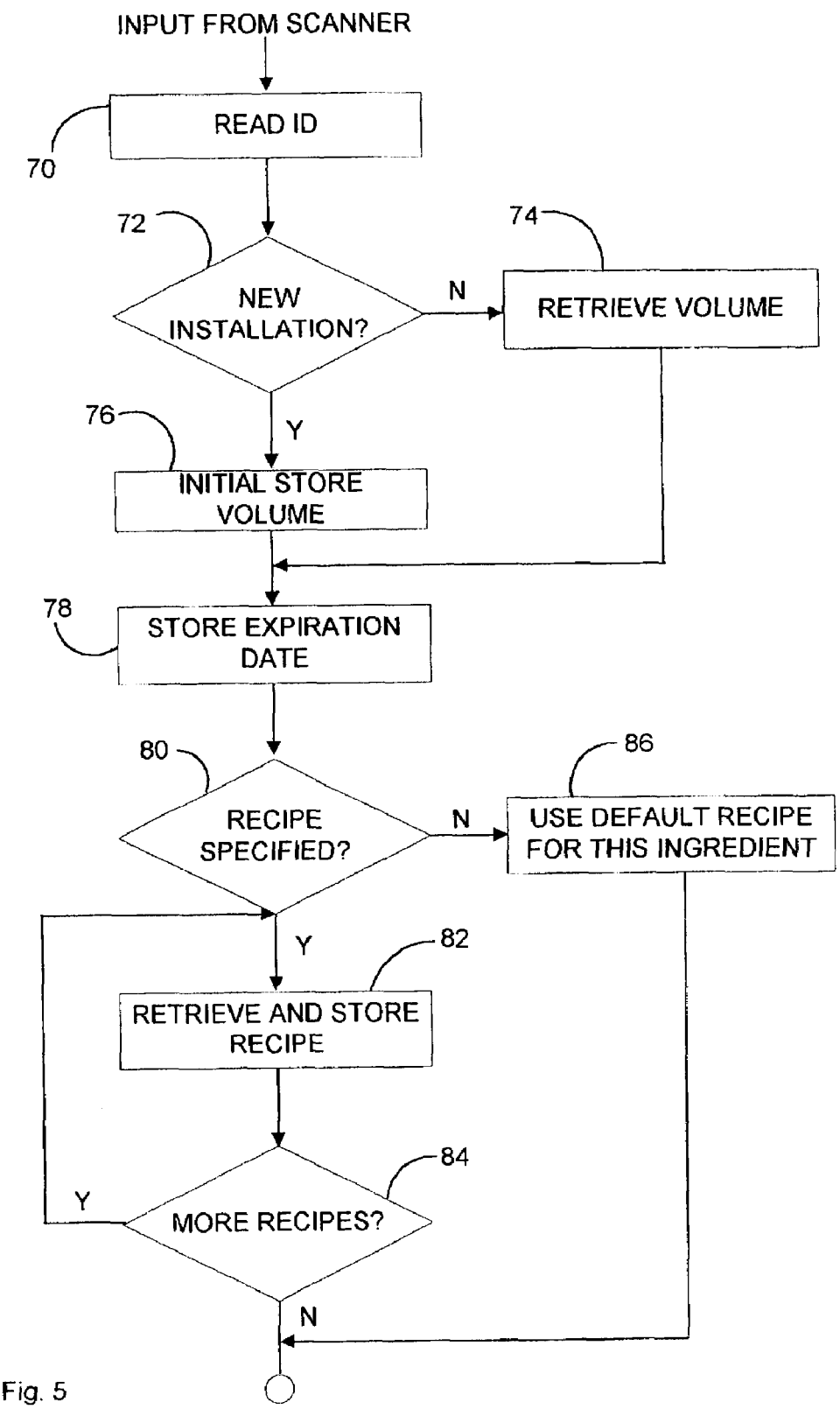
FIG. 5 is a flow diagram illustrating the manner in which the apparatus of FIGS. 1 and 2 is particularized to the specific product inputs.

A particular container may be one that is being loaded into the apparatus 10 for the first time or it may be one that has previously been loaded into the apparatus but subsequently removed therefrom, e.g., for system maintenance. Thus (see FIG. 5) responsive to scanner data input from a container, the controller reads the container identification number (step 70) and examines its process memory to determine whether the particular container has previously been loaded into the apparatus (step 72). If it has previously been loaded, the system retrieves the volume of the container in its current state ("the current volume", step 74) and uses this in controlling production operations. The "current volume" is the volume calculated during prior use of the particular container in the apparatus and stored on removing the container from the apparatus, as described in further detail below. If, on the other hand, the container is being installed for the first time, the initial container volume is stored in process memory (step 76). This initial volume may be that contained on the container tag itself, or it may be a known value for the particular type of container (e.g., base mix). The expiration date is then stored in process memory (step 78), and a determination is made as to whether a formulation for the particular ingredient is contained on the tag or is otherwise provided in connection with it (step 80). If one or more formulations are specified, it is retrieved from the scanner input data stream and stored in process memory (step 82). The process is repeated (step 84) for each additional formulation that is input. Conversely, if no specific formulation associated with the particular container is input or otherwise is provided, a default formulation for the given ingredient is used (step 86).

Figure 6:
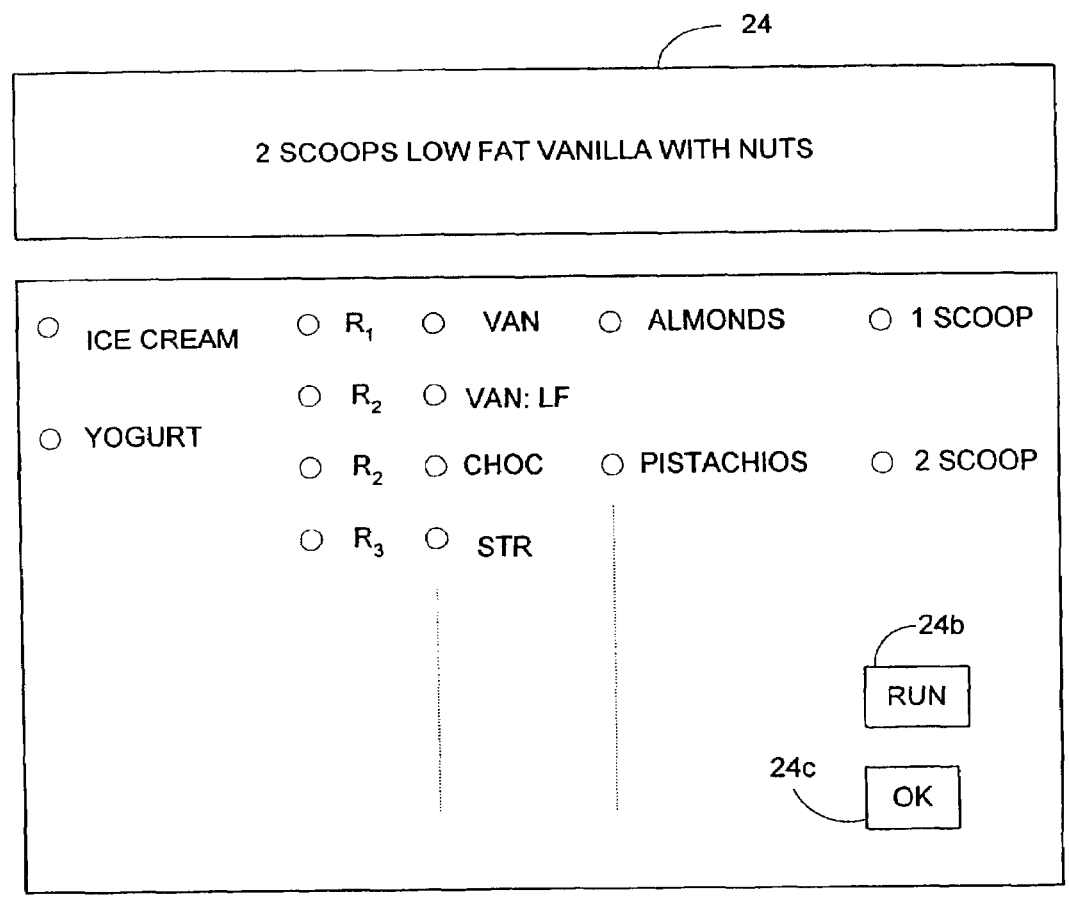
FIG. 6 shows an illustrative user control panel by which a user may select an item to be produced.

Once the data associated with the various ingredient containers is loaded into the system, and the system is brought to operating temperature, preparation of a desired end product may proceed. As illustrated in FIG. 6, dispensing control panel 20 has a number is of selector buttons 24a for choosing a desired item (e.g. yogurt, ice cream, etc.) and its grade (e.g., low fat, regular, creamy), as well as flavor (e.g., vanilla, chocolate, strawberry, etc.), mix-ins (e.g., almonds, pistachios, etc.) and amount (e.g., 1 scoop, 2 scoops, etc.), among other variables. Provision may also be made for selecting among one or more formulations ("R1", "R2", "R3", etc.) for the production. Depressing a "Run" button 24*b* starts the manufacturing process.

The display 22 illustrates the product that will be manufactured. In most cases this will be as selected by the user, and the panel may provide confirmation of this, e.g., the message "OK" may be displayed. In some cases, however, one or more choices of the user may be overridden, e.g., because they are incompatible with the particular ingredients currently loaded into the machine, or with a particular process to be used, or because there are insufficient resources (ingredients) to fulfill the request. In such a case, an indication of rejection of the selected choices may be displayed instead, and preferably the reasons for the rejection as well.

Figure 7:
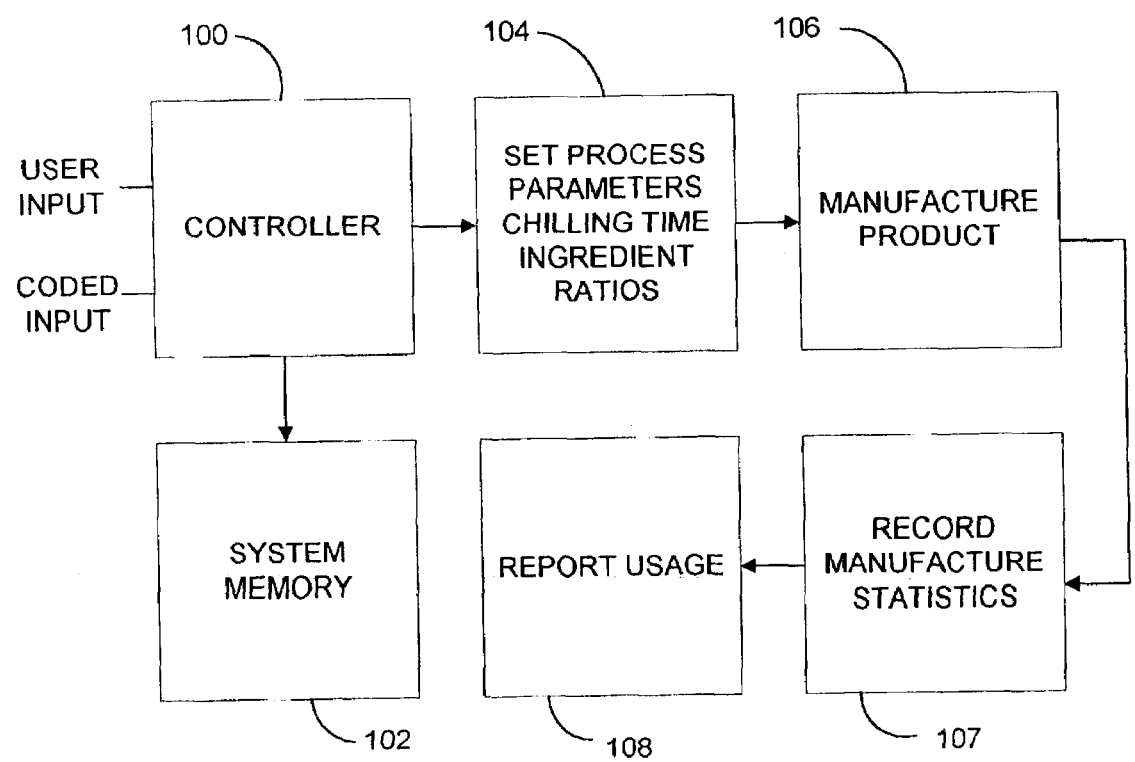
FIG. 7 is a block and line diagram illustrating operation of the apparatus of FIGS. 1 and 2 to produce an individual serving of a product on the spot.

As schematically illustrated in FIG. 7, the process actually used to manufacture a selected item is preferably controlled by three distinct inputs, namely, user inputs from the control panel 24, which specify, e.g., the nature of the desired product ("e.g., low fat vanilla"); the amount to be manufactured (e.g., "2 scoops") and desired mix-ins ("e.g., "nuts"); and unique control inputs associated with the ingredient containers 50; and overall system inputs. A controller 100 receives these inputs from the respective sources, e.g., the control panel 24 in the case of user inputs; the containers 50 in the case of specific ingredient control inputs; and a system memory 102 which contains the manufacturing and control program and associated data. In particular, process control inputs with respect to the ingredients are received directly from the containers for these ingredients, thereby eliminating the chance for human error or malfeasance in setting the manufacturing process. In the preferred embodiment of the invention, memory 102 is implemented in the form of a hard disk, but obviously may take or include other forms such as ROM, flashware, firmware, wired-in circuitry, etc. Further, it will be understood that the memory 102 need not be a single memory but may advantageously be distributed among a number of memories of various to control the overall manufacturing process.

Responsive to these inputs, the controller 100 establishes within the machine the settings that will be used to produce the specific end product requested by the user, and the specific "recipe" by which it will be produced, thereby particularizing the machine for this particular product in this specific instance, but subject to overall constraints that may be imposed by the system memory and control. The controller is advantageously a general purpose digital computer which executes the program stored in memory 102 responsive to the user inputs and to the ingredient control inputs to set the appropriated temperatures, pressures and other processing conditions of the operation. It will be understood, of course, that special-purpose computers or other forms of controllers may be used as well.

It will also be understood by those skilled in the art that the tag may, in fact, be physically dissociated from the ingredients whose processing is to be controlled, as long as the tag information is tracked in some manner to the product. For example, the tag may in fact be shipped to the processing point with the container, but physically separate from it. Further, the tag or the information on it may be shipped or otherwise transmitted entirely separate from the container, as long as there is some indicia or other mechanism on the tag and the container that associates the two. Preferably, however, the tag is encoded directly on the container as described in the preferred embodiment of the invention detailed herein.

In connection with the production (step 106) of a given product, it is desirable that statistics be kept (step 107) of the specific product manufactured, e.g., "low fat vanilla with nut mix-ins", the quantity, the specific ingredients used (identified e.g., by serial number of their containers), and the amount of such ingredients used, among other items. These statistics not only enable the local operator to determine when a particular ingredient is running low and may need replenishment, but also enable broader control and coordination of the distribution process. To this end, some or all of the manufacturing of a particular machine may be transmitted to another location (step 108) for a variety of purposes, including billing, test marketing, etc. The transmission may be accomplished in a variety of ways. For example, they may be accumulated and transmitted at periodic intervals by paper records, by recording on disk or tape, by transmission over wired or wireless communication channels or the like. Further, they may be made available to interrogation by an authorized source, either remotely or locally.

The benefits to this approach to manufacturing are many. To begin with, it facilitates integration into an ordered network of manufacturing stations or machines that may be distributed over a wide range of locations and operators. Within this network, it enables the distributor to vary process parameters on an individual, regional, or system-wide basis without changing the fundamental structure of the manufacturing apparatus and without requiring local labor to modify the apparatus in any way. For example, the distributor may determine that the tastes of consumers in a particular region of the country is for a more heavily flavored, sweeter ice cream than that prevailing in other regions. Rather than formulate flavorings of higher concentration and sweetness especially for those particular regions, and use local labor to make necessary alterations in the manufacturing process to accommodate them, the distributor need merely modify the coding on the flavoring containers to reflect a formulation that uses a greater amount of the flavoring per unit volume or mass of ice cream that is processed for a serving.

Similarly, the distributor or others may easily and inexpensively test market differing formulations in one or more regions or at one or more locations within a region in the same manner. Since no change in the underlying ingredients need be made, only changes in the formulation associated with those ingredients, no special inventory is required, and the speed of implementation can be greatly enhanced while the costs are simultaneously reduced. Further, since the local operators of the apparatus need not even be aware of the change in formulations, the test can truly be conducted "blind", and thus a more reliable assessment made as to the reception of the new "products", i.e. new formulations. Of course, fundamental changes in the nature of the ingredients themselves may also be made and readily fitted into the manufacturing process by changing the formulations to accommodate the modified or new ingredients and/or by changing one or more steps in the process.

Embedding "formulations" and other data defining some or all of the manufacturing process on a tag of a container for one or more ingredients of the process has the advantage of creating a direct and immediate association between the specific ingredient and the machine in which it is to be processed. The person operating or servicing the machine need take no special steps to change or control the manufacturing process other than to scan the container label on loading it into the machine. In the preferred embodiment described herein, the data that is included on the tag is preferably extensive, and may include, for example, one or more specifications of ingredients, amounts and concentrations of products to be used in the manufacturing process, as well as process parameters such as processing time, temperature, etc. An alternative approach merely embeds the serial number of the container on the tag carried on it. This serial number is keyed to a separate master formulation listing that is also provided to the local machine operator. The master may be provided to the operator in the form of a disk, a ROM, or other means of conveniently conveying information. This information is loaded into the local machine and thereafter used in processing the particular unit of ingredient associated with the given serial number. The disadvantage of this approach, however, is that it requires additional, even if minimal, intervention by the operator.

Figure 8:
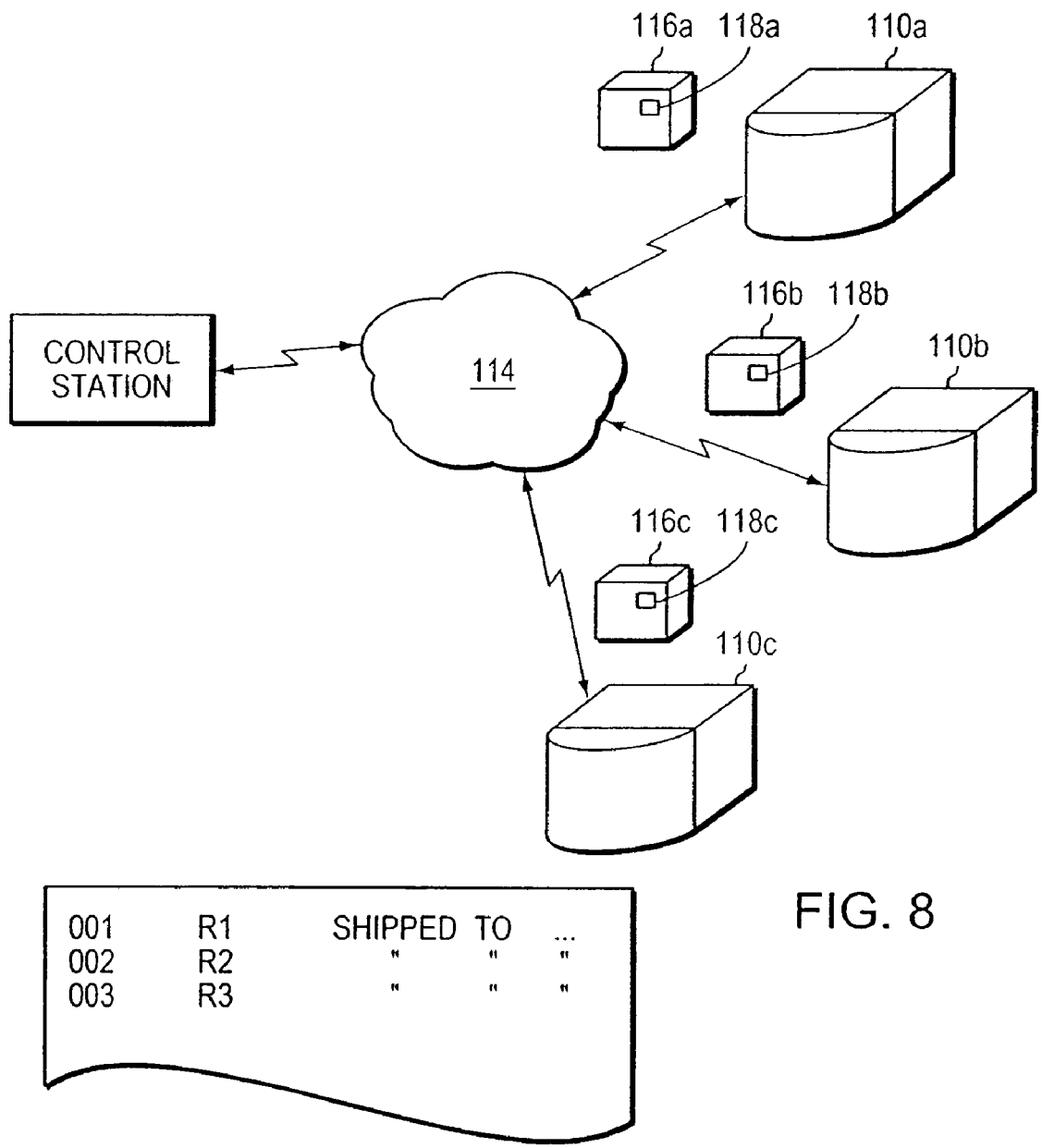
FIG. 8 is a block and line diagram of a central control system for controlling and dynamically changing the processing of one or more ingredients of a product to be manufactured.

An alternative which requires no such intervention is shown in FIG. 8. As shown, a plurality of machines 110a, 110b, 110c which are to prepare products on site to user taste are located remote from a control center or station 112. The control center may be a plant at which ingredients for processing in the machines are made or packaged; may be a distribution center; or may simply be a control center independent of manufacturing and distributing operations. It is connected for communication with the various manufacturing machines 110 through a communications link which may be wired or wireless; one such mode of communication is through a network 114, such as the internet, as illustrated schematically in FIG. 8. Containers 116a, 116b, 116c, etc. are shipped to the machines 110 for processing therein. The containers each carry a tag or label 118a, 118b, 118c, respectively, that identifies each one. For example, the label may simply be a serial number, e.g., "11435886" or other identifier by which the container may be designated. The serial number or other identifier may be unique to that particular container; or may be common to two or more containers.

The control center 112 maintains a database 120 that associates each serial number 120a with a particular set of parameters or "formulation" 120b that defines at least in part the processing for ingredients associated with that serial number. Preferably, it also contains a record of the locations to which the item bearing that serial number had been shipped. At various times, the control source 112 transmits to the machines 110 information from the database 120 that relates the serial number 120a of a unit or units of ingredient with the formulation or process parameters 120b for that unit or units. That information is stored in the machine for use in processing the particular unit bearing the particular serial number. When the control source maintains a record of the location to which a particular unit of ingredient has been shipped, the information as to that unit of ingredient need only be transmitted to the particular machine to which the unit has been shipped. Otherwise, the information may be shipped to all machines or at least to all machines which may have received a unit of ingredient covered by the information. Preferably, the time and circumstances of the information transmission is controlled by the source so that the local operator need not be involved. Of course, provision may also be made for receiving user responses to the product being tested. These responses may be entered directly on the machine itself or on a separate data entry tablet. In either case, they may be transmitted directly to the control center at the time of entry or at a later time.

An advantage to this embodiment of the invention is that the "formulation" for processing the ingredient may be changed at will from the control source and with very little effort, simply by changing the appropriate items in the database and transmitting an updated record to the manufacturing site. Further, it may be changed with respect to one to or more containers over the period of use of the container, i.e. while that container is at its end location and available for use, either while loaded in the machine which is to process it or while simply available from storage.

Thus, it is possible that the processing of a single container of ingredient in a single machine may be established and changed at will and quite simply and economically is during the course of its use in order to satisfy such developments as improved formulations, changing seasons, desired market studies, etc. This can readily be done without local intervention or even knowledge, thus allowing tight control of the manufacturing and distribution process.

Information may also, of course, be transmitted in the reverse direction, i.e., from the local machines to the central control. Thus, an inventory of the volume of various ingredients in one or more machines, the amount and composition of product that has been manufactured and dispensed in the machines, the aging of the ingredients, and other information concerning the ingredients or the machines in which they are located may be transmitted to the central control. The resultant data may be used for inventory control, for billing, for quality control, for testing, and for other purposes.

An alternative to a central control station may also be used, e.g., a portable data exchange system which is brought to or near the site of the various production apparatus. This approach may be useful, or even necessary, where, for one reason or another, it is not feasible to connect the production apparatus to a network of one form or another. However, the portable system itself should ultimately transmit collected data, or portions thereof, to a central control and desirably may receive data from central control.

From the foregoing it will be seen that I have described a method and apparatus for selectively controlling the manufacture of an individual item. The method and apparatus enable great flexibility in defining the manufacturing steps, physical processing parameters (e.g., temperature, pressure, etc.), ingredients, and ingredient ratios, among other characteristics, while allowing tight control of the operations from a central source if desired. By providing for direct reading of a container without requiring human entry of information as to the container, its contents, or its processing, the present invention not only insures against human error in data entry, but also provides security against unauthorized changes in the information which is to control the manufacturing process.

The method and apparatus are applicable to a variety of products, but are particularly well suited to the controlled production of products which are manufactured on-the-spot at least partially to individual taste or specification. It will be understood that the term "manufacturing" is used herein in the broadest sense, and includes processing, compounding, mixing or otherwise operating on and with ingredients of all types, solid, liquid, or gaseous, to transform them from their original state. Thus, it may also advantageously be applied to such other varied processes as mixing various shades of paint to achieve a specific shade, compounding prescriptions for a particular patient, compounding cosmetics, and other such applications.

What is claimed is:

1. Apparatus for controlling the processing of a product, said apparatus comprising
   a plurality of containers containing various ingredients, wherein at least one of the containers contains an ingredient distinct from another ingredient in at least one of the other containers;
   a tag associated with each container, each tag including indicia that includes an identification of the ingredient in the associated container;
   a formulator;

delivery means configured to selectively deliver the ingredients in the plurality of containers to the formulator;

a selection device for selecting from among a plurality of products that can be manufactured from the ingredients in said plurality of containers, wherein the selection device includes an input mechanism that can be activated by a user to select from the ingredients and to produce a selection signal corresponding to the selected ingredients;

a controller including memory storing a process control program that includes instructions that cause the controller, in response to the selection signal and in response to the indicia in the tags of the one or more selected ingredient container, to control the delivery means to deliver from selected ones of the plurality of containers to the formulator the ingredients necessary to produce the selected product and to control the formulator in accordance with the process control program and the tag indicia on at least one of the selected ingredient containers to cause the formulator to produce the selected product.

2. Apparatus according to claim 1 in which said processing comprises a food manufacturing process.

3. Apparatus according to claim 1 in which said processing comprises a process for manufacturing a frozen food product essentially contemporaneously with the request for such serving by the user.

4. Apparatus according to claim 1 which includes a communications link to a control station for exchanging with said station information specific to the ingredient in each of said plurality of containers.

5. Apparatus according to claim 4 in which said communications link includes a communications network.

6. Apparatus according to claim 5 in which said network comprises the internet.

7. Apparatus according to claim 1, wherein the input mechanism enables the selection of ingredients via user activation by enabling the user to select from among the plurality of products.

8. A method for automatically producing a customized food product with a machine in response to a user input provided to the machine, the method comprising:

loading a machine with a plurality of containers, each containing a respective ingredient, wherein a respective tag is associated with each container, each tag including indicia identifying the ingredient in the associated container;

reading with the machine the tags to identify the ingredients to the machine;

receiving input from a user at the machine, wherein the user selects one or more ingredients for a desired product;

in response to the user input, delivering with the machine to a formulator disposed within the machine the selected ingredients from the containers associated with the tags that have indicia identifying the selected ingredients;

within the formulator, combining the one or more selected ingredients;

manufacturing with at least the formulator the desired product from the one or more selected ingredients; and delivering with the machine the desired product to the user at the machine.

9. The method of claim 8, wherein the desired product includes a frozen food product.

* * * * *

UNITED STATES PATENT AND TRADEMARK OFFICE
CERTIFICATE OF CORRECTION

PATENT NO. : 7,640,755 B1 Page 1 of 1
APPLICATION NO. : 11/157463
DATED : January 5, 2010
INVENTOR(S) : Paul R. Kateman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1115 days.

Signed and Sealed this

Sixteenth Day of November, 2010

David J. Kappos
*Director of the United States Patent and Trademark Office*